United States Patent [19]
Freund

[11] Patent Number: 5,870,769
[45] Date of Patent: Feb. 9, 1999

[54] INTERNET ACCESS SYSTEM AND METHOD WITH ACTIVE LINK STATUS INDICATORS

[75] Inventor: Yoav Freund, Hoboken, N.J.

[73] Assignee: AT&T Corp., Middletown, N.J.

[21] Appl. No.: 839,310

[22] Filed: Apr. 18, 1997

Related U.S. Application Data

[60] Provisional application No. 60/018,964 Jul. 7, 1996.
[51] Int. Cl.[6] .................................................. G06T 1/00
[52] U.S. Cl. ...................... 707/501; 345/334; 395/200.48
[58] Field of Search ..................................... 707/501, 513, 707/511; 345/333–334, 335, 348, 356; 395/200.48, 200.31, 200.33, 200.57, 200.59

[56] References Cited

U.S. PATENT DOCUMENTS

| 5,742,768 | 4/1998 | Gennaro et al. | 395/200.33 |
| 5,761,683 | 6/1998 | Logan et al. | 707/513 |
| 5,774,670 | 6/1998 | Montulli | 395/200.57 |
| 5,801,702 | 9/1998 | Dolan et al. | 345/357 |

OTHER PUBLICATIONS

Schilit et al., "TeleWeb: Loosely Connected Access to the World Wide Web," 5th International World Wide Web Conference, Paris, France, May 6–10, 1996.
Goldberg et al., "How to Program Networked portable computers," IEEE #0–8186–4000, Jun. 1993, pp. 80–88.

Primary Examiner—Joseph H. Feild

[57] ABSTRACT

An Internet access system and method includes active link status indicators that give a user control over when a document is loaded into a cache. The system and method notifies a user of the presence or absence of a document in the cache by changing the visual characteristics of an associated link status indicator. If a user selects a link status indicator with a mouse or other input device, the system and method will fetch the document corresponding to the associated Internet link and place the document in the cache without displaying the document to the user. The system and method of this invention allow a user to fetch a document and store it in the cache while the user is viewing another document. The link status indicators include icons that are displayed adjacent to the associated Internet link.

14 Claims, 3 Drawing Sheets

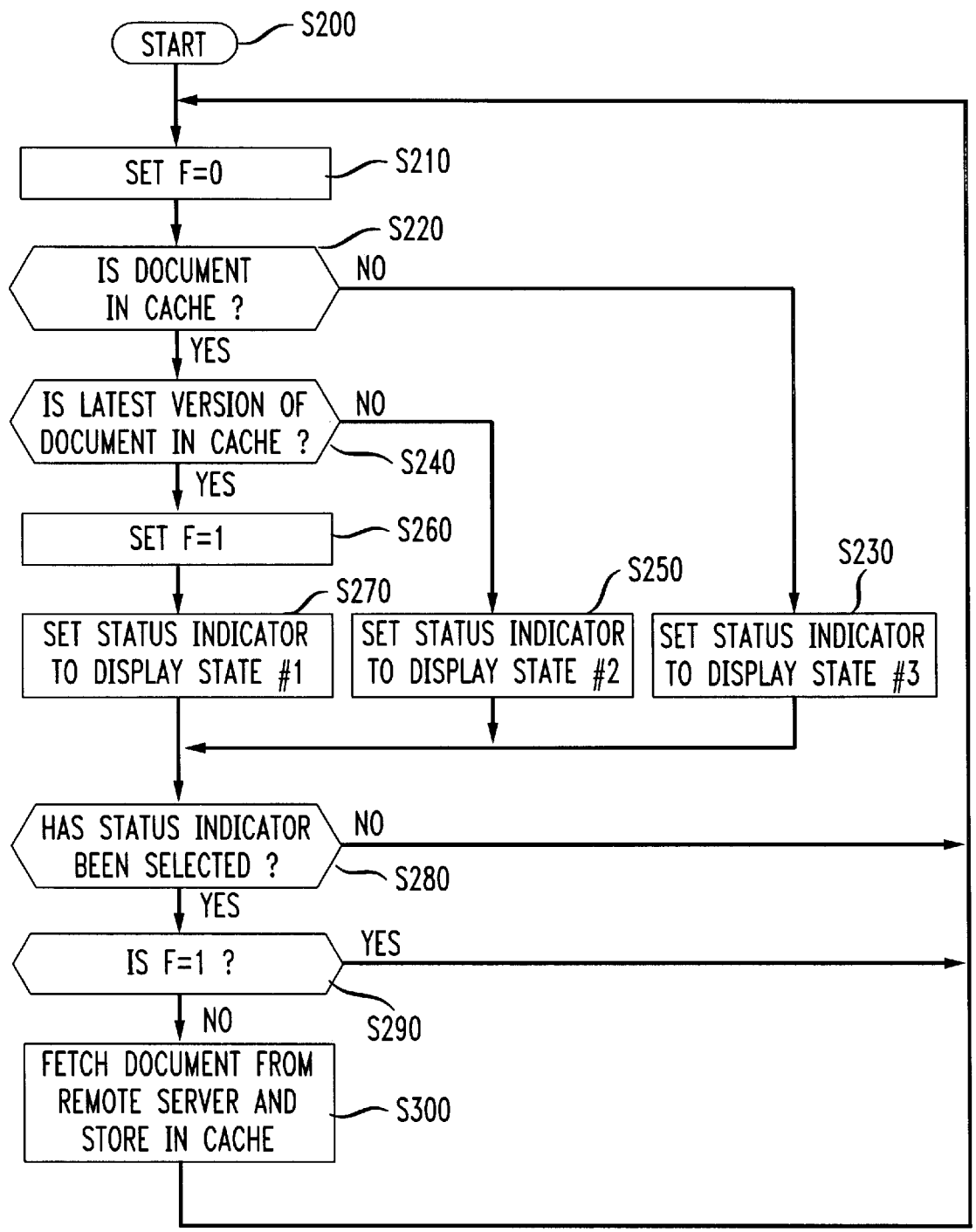

5,870,769

INTERNET ACCESS SYSTEM AND METHOD WITH ACTIVE LINK STATUS INDICATORS

CROSS REFERENCE TO RELATED APPLICATION

This application is related to prior provisional application Ser. No. 60/018964, filed on Jun. 7, 1996.

BACKGROUND OF THE INVENTION

1. Field of Invention

This invention relates to systems for accessing the Internet. More specifically, this invention is directed to an Internet access system and method with active link status indicators.

2. Description of Related Art

Most distributive information networks, such as the Internet, utilize local caches to reduce the system response time. An Internet access system, such as a World Wide Web browser, generally has access to a local cache. When a user selects a Web link to request a document, the Web browser first determines if the requested document is present in the local cache. If the requested document is present in the local cache, the Web browser simply displays the copy of the document in the cache. If the requested document is not present in the local cache, the Web browser fetches the document from the Web, places the document in the local cache and displays the document to the user.

A cache may be shared by many users of the Web, or it may only be accessible to a single user. When the cache is shared by many users, a document that has been fetched by one user may be fetched from the cache in response to subsequent requests by other users. Therefore, when the cache is shared by a large number of users, most popular Web documents will already be cached when any given user requests the document. This reduces the amount of network traffic and also reduces the length of time that a user must wait for the document.

In standard Web browsers, the browser does not indicate to the user whether a document is present in the cache. Furthermore, the user has no control over placing a document into the cache. The only indication that a user has that a document has been cached is that a second fetch of the document is generally much faster than the first fetch.

Efforts have been made to reduce the transparency of the cache and to give the user more control over the cache. An Internet access system for portable computers, disclosed in Schilit et al., "TeleWeb: Loosely Connected Access to the World Wide Web," $5^{th}$ International World Wide Web Conference, Paris, France, May 6–10, 1996, indicates Internet links to documents that are not cached in the portable computer with an icon. Thus, a user can defer attempts to fetch those documents until the portable computer is connected to the Internet.

The icons in the Schilit system tell the user that a document is not in the cache. However, the icons are not active and thus do not help the user load a document into the cache. Specifically, the Schilit system does not provide a mechanism for loading documents into the cache other than by fetching and displaying the documents in the usual fashion.

Goldberg et al., "How to Program Networked Portable Computers," IEEE #0-8186-4000, June 1993, pages 80–88, discloses an X-Window mail application that greys out the menus and buttons representing documents that are not in the local cache. When a user selects a document represented by a grayed-out menu or button, the system loads the document into the local cache.

A problem with the Goldberg system is that the technique of graying out the names of document links is not appropriate for Web browsers. One reason for this is that Web browsers currently use the display characteristics of Internet link names to represent other information. For example, when a user selects the name of a link, the link name changes color to indicate that it has been selected.

Another reason that the Goldberg system is not appropriate for Web browsers is that Internet links are being increasingly represented by graphical elements, i.e., pictures. Because of the variability of graphical elements, it is difficult to provide a standardized method of modifying their display characteristics.

In addition, the Goldberg system immediately displays the document that is loaded into the cache. Thus, the Goldberg system does not allow a user to view one document while another document is loaded into the cache.

SUMMARY OF THE INVENTION

This invention provides a system and method for accessing data from a distributive information network, such as the Internet. The system and method of this invention provide active link status indicators with visual characteristics that convey information about associated documents that are available for retrieval from the information network. In addition, the active link status indicators give a user control over when a document is fetched from the information network and stored in the cache. The system and method of this invention is particularly applicable to World Wide Web browsers.

The system and method of this invention display link status indicators that are associated with corresponding Internet links. The visual characteristics of the displayed link status indicator indicates whether or not the document represented by the Internet link is stored in the cache. If a user selects a link status indicator (e.g., by "clicking" on the indicator with a mouse), the system and method will fetch the document associated with the corresponding Internet link and store it in the cache without displaying the document to the user. Therefore, the system and method of this invention allow a user to fetch a document and store it in the cache while the user is viewing another document.

In a preferred embodiment, the link status indicators comprise icons that are displayed adjacent to their corresponding Internet link. The color and/or shape of the icon is used to indicate the presence or absence of the document in the cache.

In another embodiment, the color and/or shape of the icon is used to indicate whether the latest version of a document is stored in the cache, thereby helping a user decide whether to fetch the document.

In a further embodiment, an additional link indicator is used to convey information regarding the amount of time required to fetch the document from a remote server.

These and other features and advantages of this invention are described in or are apparent from the following detailed description of the preferred embodiments.

BRIEF DESCRIPTION OF THE DRAWINGS

The preferred embodiments of this invention will be described in detail, with reference to the following figures, wherein:

FIG. 3 is a flow chart of a preferred control routine for the Internet access system of this invention.

DETAILED DESCRIPTION OF PREFERRED EMBODIMENTS

Figure 1:
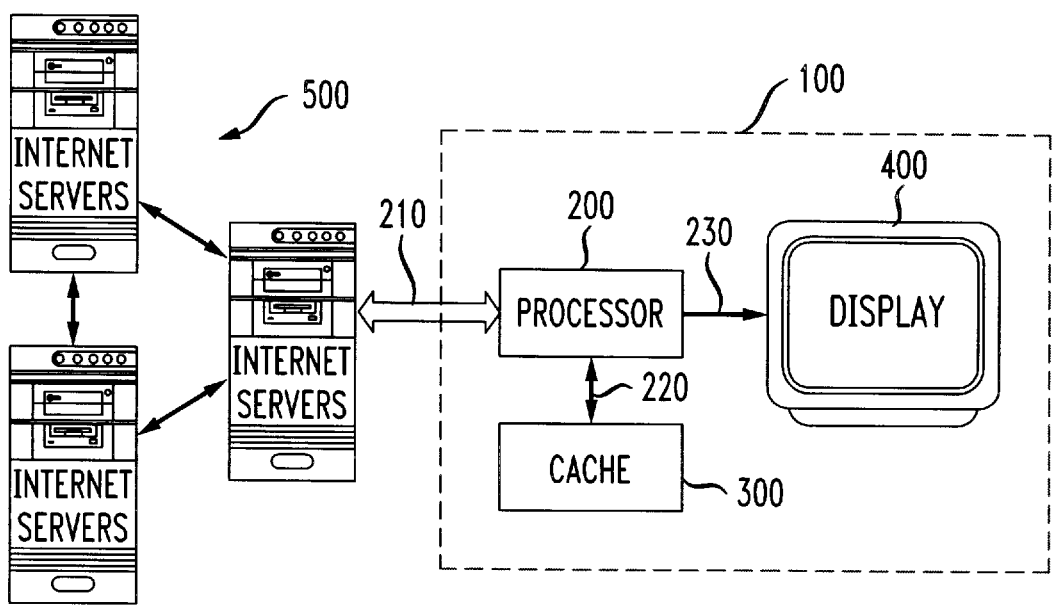
FIG. 1 is a block diagram of an Internet access system incorporating the active link status indicators of this invention.

FIG. 1 illustrates the Internet access system 100 of this invention. The system 100 includes a processor 200, a cache 300 and a display 400.

The processor 200 sends data to and receives data from remote Internet servers 500 over a communication link 210. The processor 200 sends the data to the cache 300 over a signal line 220, and to the display 400 over a signal line 230.

The processor 200 is programmed with Internet access software, preferably World Wide Web browsing software, that has been modified by means of Computer Graphics Interface scripts to embody the invention. In operation, the processor 200 displays the data (e.g., documents) retrieved from the Internet servers 500 on the display 400.

Figure 2:
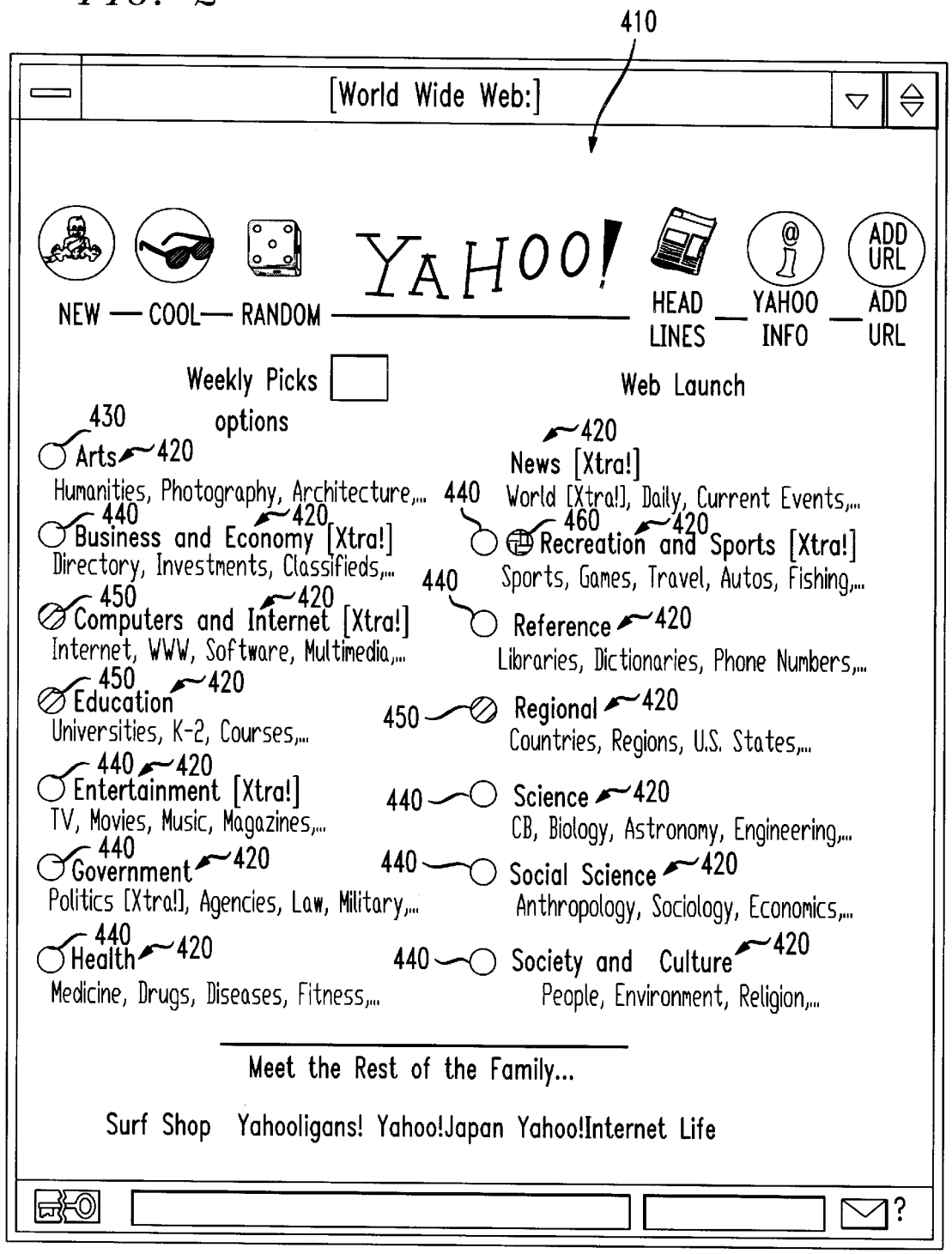
FIG. 2 is a representative display generated by the Internet access system of this invention, showing a World Wide Web document with active link status indicators according to this invention.

FIG. 2 shows a representative document 410 from a World Wide Web site displayed by the processor 200 on the display 400. The displayed document 410 includes a list of Internet links 420 that are associated with other documents that are accessible from the Internet servers 500, such as from the World Wide Web. The Internet links 420 are shown as text, but they may also be graphical elements.

When a user of the system 100 selects a particular Internet link 420 with a mouse or other input device (not shown), the processor 200 retrieves or fetches the document associated with that Internet link 420. If the user selects a document that is already stored in the cache 300, the processor 200 retrieves the document from the cache 300 and displays it on the display 400. If the selected document is not already stored in the cache 300, the processor 200 fetches the document from the Internet server 500 on which the document is located and displays the document on the display 400.

Each of the Internet links 420 has a link status indicator 430 associated with, but displayed distinctly from, the Internet link 420. The visual characteristics (i.e., the display state) of each link status indicator 430 indicates whether a copy of the document associated with the corresponding Internet link 420 is in the cache 300. In the preferred embodiment, each link status indicator 430 is an icon that is set to a first display state, when the associated document is not stored in the cache 300 and a second display state, if the associated document is stored in the cache 300. The first display state is preferably a white button 440, while the second display state is preferably a green button 450.

When the user selects a white button 440, the processor 200 fetches the associated document from the Internet server 500 and stores it in the cache 300 without displaying the document. This operation is referred to as "pre-fetching." Once the processor 200 stores the fetched document in the cache 300, the white button 440 associated with that document is changed to a green button 450.

An advantage of the Internet access system 100 of this invention is that it provides a user wishing to examine several different documents accessible via the Internet links 420 with information regarding which of those documents are not yet stored in the cache 300. Accordingly, the user can select the documents that are not yet cached for background pre-fetching, while viewing documents that are already cached. By the time the user has finished working with the documents that are already cached, the other documents will generally be available in the cache 300. Thus, the system 100 will respond more rapidly than it would have if each non-cached document had been fetched at the time the user wished to display it.

In the preferred embodiment, the visual characteristics of the link status indicator 430 is used to indicate whether a copy of the document is stored in the cache 300. However, the visual characteristics of the link status indicator can also be used to indicate whether the latest version of the document associated with the Internet link 420 is stored in the cache 300.

In a second embodiment, the link status indicator 430 is set to a third display state, preferably a yellow button, when the version of the corresponding document stored in the cache 300 is not the latest version.

In addition, additional link status indicators can be used to convey other information relevant to the user in deciding whether or not to pre-fetch a document. For example, an additional link status indicator 460 can be used to warn the user that fetching the associated document will exceed a predetermined cost budget.

FIG. 3 shows a preferred control routine for the Internet access system 100 of this invention. The control routine is iterative, and is performed for every Internet link 420 displayed by the processor 200 on display 400.

The routine starts at step S200 and proceeds to step S210, where the control system sets the flag F to zero. Control then continues to step S220, where the control system determines if the document represented by the Internet link 420 is stored in the cache 300. If the document is not stored in the cache 300, control continues to step S230. Otherwise, control jumps to step S240. In step S230, the control system sets the link status indicator 430 associated with the document to the third display state. Control then jumps to step S280.

In step S240, the control system determines if the document stored in the cache 300 is the latest version, i.e., whether a newer version is available for fetching from the remote server 500. If the version of the document in the cache 300 is not the latest version, control continues to step S250. Otherwise, control jumps to step S260. In step S250, the control system sets the link status indicator 430 associated with the document to the second display state. Control then jumps to step S280.

In step S260, the control system sets the flag F to one. Control then continues to step S270, where the control system sets the link status indicator 430 associated with the document to the first display state. Control then continues to step S280.

In step S280, the control system determines if the link status indicator 430 has been selected by the user. If the link status indicator 430 has been selected, control continues to step S290. Otherwise, the control returns to step S210 and the routine is repeated for the next status indicator 430.

In step S290, the control system determines if the flag F is set to 1. If it is, control returns to step S210. Otherwise, control continues to step S230, where the processor 200 fetches the document associated with the selected link status indicator 430 from the remote server 500 on which it is located, and stores the document in the cache 300. Control then returns to step S210.

The processor 200 is preferably implemented on a programmed general purpose computer. However, it can also be implemented on a special purpose computer, a programmed microprocessor or microcontroller and peripheral integrated circuit elements, an ASIC or other integrated circuit, a hardwired electronic or logic circuit such as a discreet element circuit, a programmable logic device such as a FPGA, PLD, PLA or PAL, or the like. In general, any device on which a finite state machine capable of implementing the flow chart shown in FIG. 3 and capable of fetching a document from the World Wide Web can be used to implement the processor 200 of this invention.

The cache 300 is preferably implemented using static or dynamic RAM. However, the cache 300 can also be implemented using a floppy disk and disk drive, a writable optical disk and disk drive, a hard drive, flash memory or the like.

While this invention has been described in conjunction with the specific embodiments outlined above, it is evident that many alternatives, modifications and variations will be apparent to those skilled in the art. As discussed above, the indicator 430 is not limited to the shape and color shown in the preferred embodiment of FIG. 2. Accordingly, the preferred embodiments of the invention as set forth above are intended to be illustrative not limiting. Various changes may be made without departing from the spirit and scope of the invention as defined in the following claims.

What is claimed is:

1. A system for accessing data from a distributive information network, comprising:
   a processor that receives data from the distributive information network;
   a memory that stores the data received from the distributive information network; and
   a display that displays the data, at least one link corresponding to other data accessible from the distributive information network, and at least one link status indicator associated with but distinct from each at least one link, visual characteristics of each link status indicator conveying information regarding the other data corresponding to its associated link, the processor responding to a selection of at least one link status indicator by retrieving, when the other data is not already stored in the memory, the other data associated with its associated link from the distributive information network and storing the other data in the memory without displaying the other data on the display.

2. The system of claim 1, wherein, for each at least one link, the at least one link status indicator is displayed adjacent to that link.

3. The system of claim 1, wherein the visual characteristics include the color of the link status indicator.

4. The system of claim 1, wherein, for each at least one link, the visual characteristics of one associated link status indicator indicates whether the corresponding other data is stored in the memory.

5. The system of claim 4, wherein the one associated link status indicator is a first color when the corresponding other data is not stored in the memory and a second color when the corresponding other data is stored in the memory.

6. The system of claim 1, wherein, for each at least one link, when the corresponding other data is stored in the memory, the visual characteristics of one associated link status indicator indicates whether an updated version of the corresponding other data is available for retrieval from the distributive information network.

7. The system of claim 1, wherein, for each at least one link, the visual characteristics of one associated link status indicator indicates whether fetching the corresponding other data from the distributive information network will exceed a predetermined budget threshold.

8. A method of accessing and displaying data from a distributive information network, comprising:
   receiving data from the distributive information network;
   displaying the retrieved data;
   displaying at least one link corresponding to other data accessible from the distributive information network;
   displaying, for each link, at least one link status indicator associated with but distinct from that link; and
   conveying, for each link, information about the corresponding other data through visual characteristics of the at least one associated link status indicator;
   wherein, when one of the at least one link status indicators associated with one of the at least one links is selected, the method further comprising:
      retrieving the other data corresponding to the selected link status indicator; and
      storing the retrieved other data in a memory without displaying the retrieved other data.

9. The method of claim 8, wherein, for each at least one link, the associated at least one link status indicator is displayed adjacent to that link.

10. The method of claim 8, wherein the visual characteristics include color.

11. The method of claim 8, wherein, for each at least one link, the visual characteristics of one associated link status indicator indicates whether the other data corresponding to that link is stored in the memory.

12. The method of claim 11, wherein the one associated link status indicator is a first color when the corresponding other data is not stored in memory and a second color when the corresponding other data is stored in the memory.

13. The method of claim 8, wherein, for each at least one link, when the corresponding other data is stored in the memory, the visual characteristics of one associated link status indicator indicates whether an updated version of the corresponding other data is available for retrieval from the distributive information network.

14. The method of claim 8, wherein, for each at least one link, the visual characteristics of one associated link status indicator indicates whether fetching the corresponding other data from the distributive information network will exceed a predetermined budget threshold.

* * * * *